United States Patent
Alba et al.

(10) Patent No.: US 9,681,174 B2
(45) Date of Patent: *Jun. 13, 2017

(54) TELEVISION CONTROL INTERFACE WITH ELECTRONIC GUIDE

(71) Applicant: Rovi Guides, Inc., San Carlos, CA (US)

(72) Inventors: Theresa A. Alba, Fremont, CA (US); Marcia A. Casement, San Jose, CA (US); William De Stein, Pleasanton, CA (US); David Folker, Fremont, CA (US); Keith W. Hunwick, Mountain View, CA (US); Kenneth D. Johnson, San Jose, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,376

(22) Filed: Jun. 17, 2016

(65) Prior Publication Data

US 2016/0295289 A1    Oct. 6, 2016

Related U.S. Application Data

(63) Continuation of application No. 14/942,846, filed on Nov. 16, 2015, now abandoned, which is a
(Continued)

(51) Int. Cl.
*H04N 5/445*    (2011.01)
*H04N 21/431*    (2011.01)
(Continued)

(52) U.S. Cl.
CPC ....... *H04N 21/4316* (2013.01); *G06F 3/0482* (2013.01); *G06F 3/04817* (2013.01);
(Continued)

(58) Field of Classification Search
CPC .. H04N 5/44543; H04N 21/482; H04N 21/84; H04N 21/4821; H04N 21/4316
(Continued)

(56) References Cited

U.S. PATENT DOCUMENTS 5,121,477 A * 6/1992 Koopmans .......... G06F 3/04895
                                                       715/762
5,297,249 A   3/1994 Bernstein et al.
(Continued)

OTHER PUBLICATIONS

Non-Final Office Action for U.S. Appl. No. 13/027,677 dated Mar. 21, 2012, 6 pages.

*Primary Examiner* — Annan Shang
(74) *Attorney, Agent, or Firm* — Ropes & Gray LLP

(57) ABSTRACT

An on-screen menu method and system for controlling the functions of integrated electronic devices and a television schedule system and method for displaying television schedule information on a television screen includes a program guide having a schedule information area that depicts the programs that are being presented on each channel at each time during the day and an interconnected series of menus to control the features of the integrated electronic devices. An input device allows the viewer to move a pointer over different interactive areas of the guide and the function performed when the area is activated is displayed in a contextual help window. Various control glyphs provide for recursive interaction with the guide.

20 Claims, 19 Drawing Sheets

Related U.S. Application Data continuation of application No. 14/043,611, filed on Oct. 1, 2013, now Pat. No. 9,191,715, which is a continuation of application No. 13/027,677, filed on Feb. 15, 2011, now Pat. No. 8,578,414, which is a continuation of application No. 12/748,692, filed on Mar. 29, 2010, now abandoned, which is a continuation of application No. 11/894,679, filed on Aug. 20, 2007, now abandoned, which is a continuation of application No. 11/402,404, filed on Apr. 11, 2006, now abandoned, which is a continuation of application No. 10/159,702, filed on May 28, 2002, now Pat. No. 7,062,777, which is a continuation of application No. 09/032,374, filed on Feb. 27, 1998, now abandoned.

(60) Provisional application No. 60/039,278, filed on Feb. 28, 1997.

(51) Int. Cl.
| | | |
|---|---|---|
| *G06F 3/0484* | (2013.01) | |
| *G06F 3/0489* | (2013.01) | |
| *H04N 21/422* | (2011.01) | |
| *H04N 21/472* | (2011.01) | |
| *H04N 21/4788* | (2011.01) | |
| *H04N 21/482* | (2011.01) | |
| *H04N 21/4786* | (2011.01) | |
| *G06F 3/0481* | (2013.01) | |
| *G06F 3/0482* | (2013.01) | |
| *H04N 5/45* | (2011.01) | |
| *H04N 5/57* | (2006.01) | |
| *H04N 9/64* | (2006.01) | |
| *H04N 17/04* | (2006.01) | |
| *H04N 21/485* | (2011.01) | |
| *H04N 21/478* | (2011.01) | |

(52) U.S. Cl.
CPC ...... *G06F 3/04847* (2013.01); *G06F 3/04897* (2013.01); *H04N 5/44543* (2013.01); *H04N 21/42204* (2013.01); *H04N 21/4312* (2013.01); *H04N 21/472* (2013.01); *H04N 21/4786* (2013.01); *H04N 21/4788* (2013.01); *H04N 21/482* (2013.01); *H04N 21/4821* (2013.01); *H04N 5/45* (2013.01); *H04N 5/57* (2013.01); *H04N 9/643* (2013.01); *H04N 17/045* (2013.01); *H04N 21/47815* (2013.01); *H04N 21/485* (2013.01)

(58) Field of Classification Search
USPC .............................. 725/37–61; 709/217–231
See application file for complete search history.

(56) References Cited

U.S. PATENT DOCUMENTS

| | | | |
|---|---|---|---|
| 5,506,946 A | 4/1996 | Bar et al. | |
| 5,532,753 A | 7/1996 | Buchner et al. | |
| 5,532,754 A | 7/1996 | Young et al. | |
| 5,548,345 A * | 8/1996 | Brian | H04N 5/44543 345/169 |
| 5,559,549 A | 9/1996 | Hendricks et al. | |
| 5,585,838 A | 12/1996 | Lawler et al. | |
| 5,604,544 A | 2/1997 | Bertram | |
| 5,619,684 A | 4/1997 | Goodwin et al. | |
| 5,675,733 A | 10/1997 | Williams | |
| 5,699,107 A * | 12/1997 | Lawler | H04N 5/44543 348/E5.105 |
| 5,731,844 A * | 3/1998 | Rauch | G11B 27/028 348/564 |
| 5,793,438 A * | 8/1998 | Bedard | H04N 5/44543 348/561 |
| 5,805,763 A * | 9/1998 | Lawler | H04N 5/44543 348/E5.105 |
| 5,822,123 A | 10/1998 | Davis et al. | |
| 5,850,218 A * | 12/1998 | LaJoie | H04N 21/84 348/E5.102 |
| 5,870,768 A | 2/1999 | Hekmatpour | |
| 5,880,768 A * | 3/1999 | Lemmons | H04N 5/44543 348/E5.097 |
| 5,893,070 A | 4/1999 | Garber et al. | |
| 5,899,999 A | 5/1999 | De Bonet | |
| 5,909,212 A * | 6/1999 | Nishina | G06F 3/0219 348/563 |
| 5,982,445 A | 11/1999 | Eyer et al. | |
| 5,986,650 A * | 11/1999 | Ellis | H04N 5/44543 348/563 |
| 6,005,562 A | 12/1999 | Shiga et al. | |
| 6,005,601 A * | 12/1999 | Ohkura | H04N 21/482 348/E5.105 |
| 6,006,257 A | 12/1999 | Slezak | |
| 6,016,144 A * | 1/2000 | Blonstein | H04N 5/44543 348/553 |
| 6,035,330 A | 3/2000 | Astiz et al. | |
| 6,078,348 A | 6/2000 | Klosterman et al. | |
| 6,088,708 A | 7/2000 | Burch et al. | |
| 6,118,492 A | 9/2000 | Milnes et al. | |
| 6,128,009 A * | 10/2000 | Ohkura | H04N 5/44543 348/563 |
| 6,137,950 A * | 10/2000 | Yuen | G06K 19/08 348/E5.105 |
| 6,151,059 A | 11/2000 | Schein et al. | |
| 6,167,328 A * | 12/2000 | Takaoka | B25J 9/1671 318/568.1 |
| 6,172,677 B1 | 1/2001 | Stautner | |
| 6,177,931 B1 | 1/2001 | Alexander et al. | |
| 6,191,781 B1 * | 2/2001 | Chaney | H04N 5/50 345/158 |
| 6,426,779 B1 | 7/2002 | Noguchi et al. | |
| 6,499,138 B1 | 12/2002 | Swix et al. | |
| 6,571,390 B1 | 5/2003 | Dunn et al. | |
| 6,903,723 B1 * | 6/2005 | Forest | A61F 4/00 345/157 |
| 7,225,142 B1 | 5/2007 | Apte et al. | |
| 8,683,539 B1 | 3/2014 | Harvey et al. | |
| 9,191,722 B2 * | 11/2015 | Alexander | H04N 5/44543 |
| 2002/0010926 A1 | 1/2002 | Lee | |
| 2002/0042923 A1 | 4/2002 | Asmussen et al. | |
| 2002/0054063 A1 * | 5/2002 | Nishina | G06F 3/0219 715/716 |
| 2002/0059581 A1 * | 5/2002 | Billock | H04N 7/17318 725/25 |
| 2002/0073424 A1 * | 6/2002 | Ward, III | H04N 5/44543 725/42 |
| 2002/0100044 A1 * | 7/2002 | Daniels | H04N 5/44543 725/39 |
| 2003/0066085 A1 | 4/2003 | Boyer et al. | |
| 2008/0184321 A1 * | 7/2008 | Lemmons | H04N 5/44543 725/100 |
| 2012/0185901 A1 | 7/2012 | MacRae et al. | |

\* cited by examiner

CHANNEL DATA TABLE

| Offset | 7 | 6 | 5 | 4 | 3 | 2 | 1 | 0 | Offset |
|---|---|---|---|---|---|---|---|---|---|
| 0x00 | colspan=8 | TYPE = 0x01 | | | | | | | |
| 0x01 | colspan=8 | NBR BLOCKS | | | | | | | |
| 0x02 | colspan=8 | 0x00 | | | | | | | |
| 0x03 | colspan=8 | NBR CHANNELS | | | | | | | |
| 0x04 | MSB | colspan=6 | CHANNEL ID | | | | | LSB | 0x00 |
| 0x06 | DPF | ICF | NDF | /// | /// | /// | NF | TMSB | 0x02 |
| 0x07 | colspan=8 | TUNE CHANNEL NBR | | | | | | | 0x03 |
| 0x08 | colspan=8 | TRANSPONDER NBR | | | | | | | 0x04 |
| 0x09 | colspan=8 | SATELLITE NBR | | | | | | | 0x05 |
| 0x0A | /// | colspan=2 | SOURCE | | colspan=4 | CHANNEL TYPE | | | NMSB | 0x06 |
| 0x0B | colspan=8 | NATIVE CHANNEL NBR | | | | | | | 0x07 |
| 0x0C | colspan=8 | NAME MASK BITS | | | | | | | 0x08 |
| 0x0D | colspan=8 | FAVORITES LINK | | | | | | | 0x09 |
| 0x0E | MSB | colspan=6 | SHOWLIST HANDLE TABLE HANDLE | | | | | LSB | 0x0A |
| 0x10 | MSB | colspan=6 | NAME AFFILIATION STRING | | | | | LSB | 0x0C |
| 0x18 | MSB | colspan=6 | DUPLICATE CHANNELS HANDLE | | | | | LSB | 0x14 |

FIG. 5A

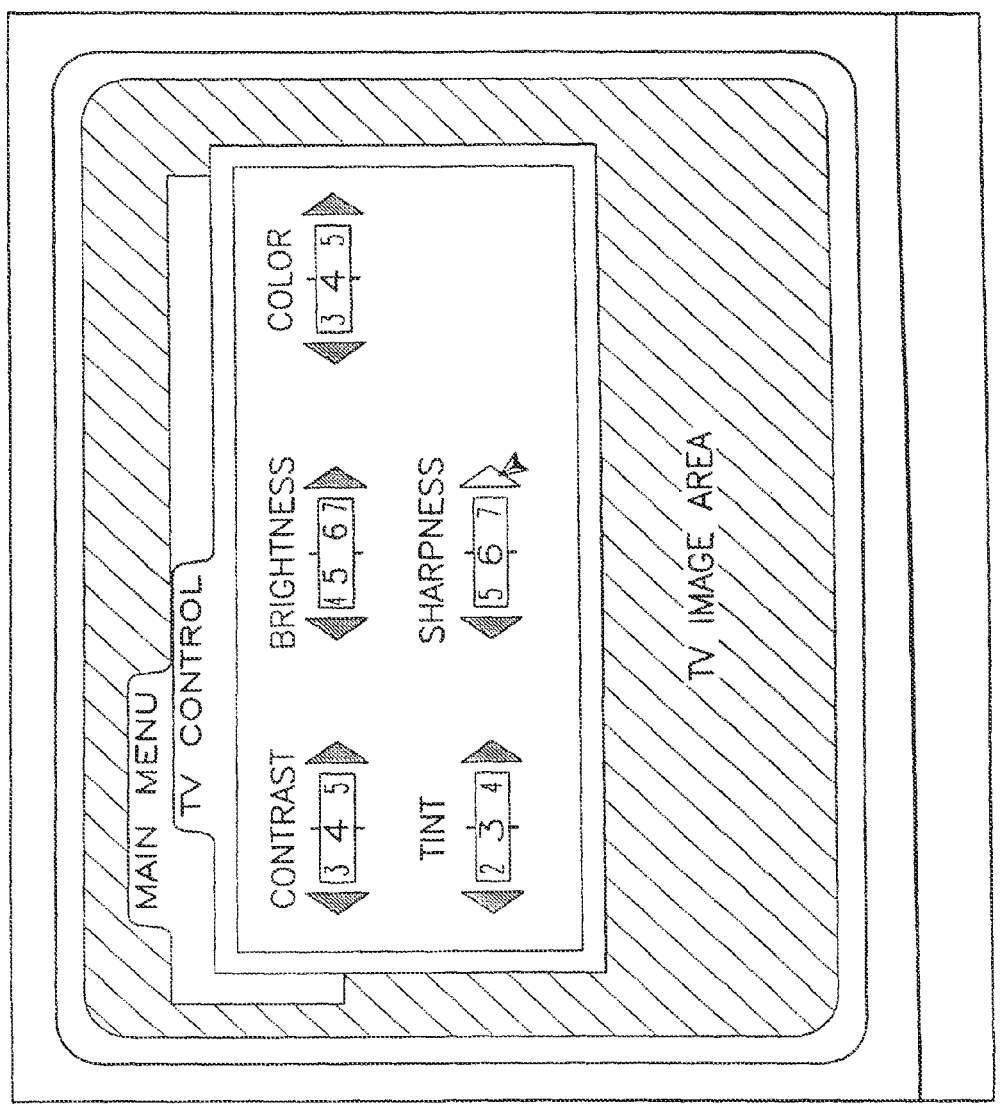

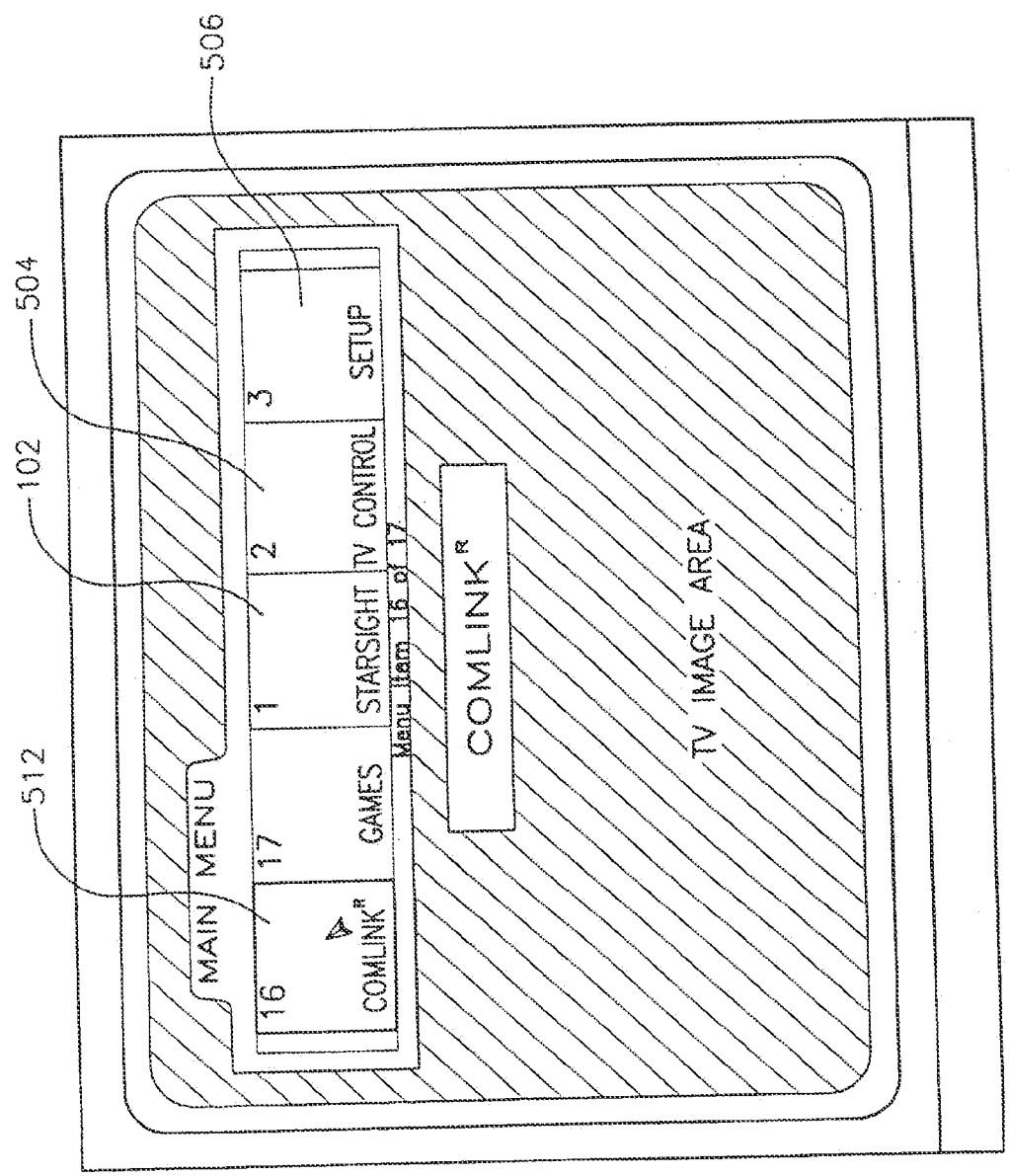

TELEVISION CONTROL INTERFACE WITH ELECTRONIC GUIDE

CROSS-REFERENCE TO RELATED APPLICATION(S)

This patent application is a continuation of U.S. patent application Ser. No. 14/942,846, filed Nov. 16, 2015, which is a continuation of U.S. patent application Ser. No. 14/043,611, filed on Oct. 1, 2013, now U.S. Pat. No. 9,191,715, which is a continuation of U.S. patent application Ser. No. 13/027,677, filed on Feb. 15, 2011, now U.S. Pat. No. 8,578,414, which is a continuation of U.S. patent application Ser. No. 12/748,692, filed on Mar. 29, 2010, now abandoned, which is a continuation application of U.S. patent application Ser. No. 11/894,679, filed Aug. 20, 2007, now abandoned, which is a continuation of U.S. patent application Ser. No. 11/402,404, filed Apr. 11, 2006, which is a continuation of U.S. patent application Ser. No. 10/159,702, filed May 28, 2002, now U.S. Pat. No. 7,062,777, which is a continuation of U.S. patent application Ser. No. 09/032,374, filed Feb. 27, 1998, now abandoned, which claims benefit from a U.S. Provisional Patent Application No. 60/039,278, filed on Feb. 28, 1997, the disclosures of each of which are incorporated herein by reference.

BACKGROUND OF THE INVENTION

The present invention generally relates to television schedule information, and more particularly to a system and method for displaying a television program guide on a television screen.

As the number of television stations in a metropolitan area or on a cable network has increased, the number of programs of potential interest, that are presented to a viewer has risen dramatically. With the use of dish antennas capable of receiving direct satellite signals, the multitude of programs available to the viewer has further increased.

Additionally, television faces a digital future that will see the merger of television and PC technology. The television set of the future will include a micro-computer, a modem of interconnectivity with other computers over networks, intranets, and the Internet, and be connectable to computer peripherals such as printers. Such capabilities as near "video on demand" (NVOD), "video on demand", "access to the world wide web", "audio on demand", etc. will be present the viewer with a plethora of information and bandwidth. In addition to PC capabilities, viewers will want to control other consumer electronic devices such as VCR's and surround sound receivers.

As has become increasingly evident, information overload can actually reduce the usefulness of the information delivered. Accordingly, a great challenge exists to provide an interface that manages and provides an intelligent, user-friendly interface to the information available.

Consequently, television schedule systems or electronic program guides (EPG) that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other sub-menus with additional options.

The recent development of television schedule systems, such as the above described patent to Young, have created many new challenges. One such challenge is to manage intelligently the vast stores of information available and provide user access and control directly through an electronic program guide. Another challenge is to facilitate easy access to a wide range of functionality through the combination of a limited number of user interactions. And still another challenge is to control several differing integrated electronic devices with the same ease of use incorporated into each.

SUMMARY OF THE INVENTION

The present invention provides a system and method of accessing a series of menus for controlling a variety of integrated electronic devices and for displaying schedule information on a visual interface, such as a television screen, a computer monitor or the like. An integrated electronic device is any device that has been configured to accept and perform the commands of the on-screen menuing system. The present invention also provides a system and method for allowing the viewer to navigate and interact with a program guide that is displayed, for example, on the viewer's television screen. The program guide will usually include a schedule information area that depicts the programs that are being presented on each channel at each time during the day. With an input device, such as a remote control device, pointing device, mouse, keyboard, microphone or the like, the viewer can browse through the schedule information area and/or obtain more information about programs of particular interest.

According to one aspect of the invention, actions are directly invoked, by moving a pointer over areas of the visual interface, and selecting or "clicking" on the area.

In one aspect of the invention, a system and method is provided for allowing the viewer to utilize display action controls, configured as glyphs, to recursively vary the configuration of the display area. Each glyph is activated by a point and click action of the user input, device and serves as a switch for changing between two modes.

According to one aspect of the invention, a system and method is provided for accessing a series of menus and host functions that control a variety of integrated consumer electronic devices.

According to one aspect of the invention, a system and method is provided for allowing the user to easily change the time frame displayed on the EPG guide, and the accompanying viewer guide by activating the time bar glyph and then activating a specific time indicator glyph.

According to one aspect of the invention, a system and method is provided for changing the configuration of the pointer/cursor to provide, the user with additional or alternate information. The pointer/cursor changes depending on the location of the pointer/cursor on the EPG display guide.

According to one aspect of the invention, a system and method is provided for graphically depicting the current time and the show time remaining by displaying a transparent shadow that proceeds across the EPG screen from left to right.

BRIEF DESCRIPTION OF TEE DRAWINGS

FIGS. 5A-5D are schematic diagrams of data structures in the database.

FIG. 7B-7C are screen depictions of a series of host function commands.

FIG. 7D-7E are screen depictions of a series of sub-menus.

DESCRIPTION OF THE SPECIFIC EMBODIMENTS

Overview of the Interactive Screen

The present invention provides an on-screen menuing system and method for controlling several integrated consumer electronic devices and a schedule system and method for displaying schedule information on a visual interface, such as a television screen, computer monitor or the like. The system and method is particularly useful for use with television schedule information. The television schedule information is presented in a program guide having a schedule information area depicting the program that is being shown on each channel for a period of time, e.g., a day, week or longer. Additionally, the EPG displays the controls of functions for various integrated electronic devices in a series of menus.

The on-screen menuing system provides a series of interactive menus. These interactive menus include commands to control the functions of the connected electronic devices that are configured to accept and perform the commands of the on-screen menuing system.

The on-screen menu system and method for controlling several connected electronic devices and television schedule system include an input device, such as a remote control device, pointing device, mouse, keyboard, microphone or the like, to allow the user to browse through the menu or schedule information area, obtain more information about programs of particular interest and control various features of the integrated electronics.

The controller may comprise a trackball, cursor controller, pointing device, a microphone, for allowing voice activation, a number of keys or buttons that function to move the viewer around the screen, or the like. In the preferred embodiment, the controller comprises a scrolling mechanism for displacing a movable cursor through a matrix of cells or windows on the screen. The cursor may comprise a physical icon on the screen, or it may be represented by highlighting or other visual indications of the cells or windows that are scrolled through by the viewer.

Figure 1:
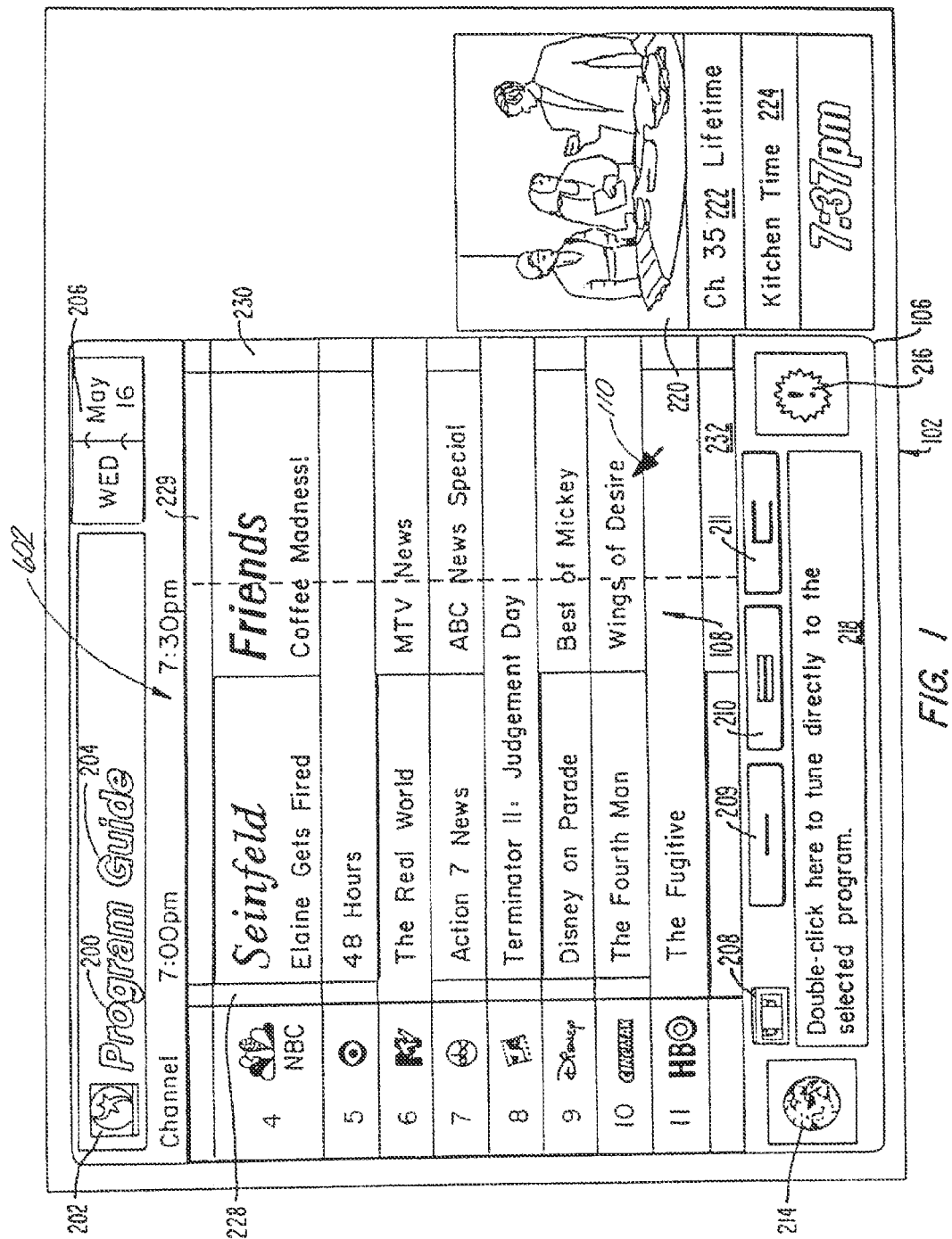
FIG. 1 is a representation of an embodiment of the EPG display of the present invention.

FIG. 1 illustrates a program guide 102 for the television schedule system of the present invention. The program guide 102, which is the primary mode in the television schedule system, includes a number of screen information areas or windows in a particular screen where the viewer operates an input device, such as a pointer device described above, to move around vertically and horizontally and to interact with that screen area's function. Preferably, the currently active screen area will be indicated to the viewer, for example, by changing the background color from a light greyscale metallic to a brighter, active color within each screen area are one or more items, typically arranged in a matrix or grid so that the viewer can scroll through the grid. The items can be selected or activated with the input device.

As shown in FIG. 1, program guide 102 preferably includes a schedule information area 106 having a program matrix 108 of cells or items that depict the shows that are being presented on each channel at each time during the day. Program guide 102 conveniently lists the channels in a vertical column to the left of the program matrix 108 and the times in a time bar 602 in a horizontal row above matrix 108. The viewer selects an area by moving a pointer 110 over the area associated with a desired action. When the pointer 110 is moved over an area, the item may be automatically highlighted with a brighter color to indicate the viewer's location.

In FIG. 1, program guide 102 includes a number of other information areas. For example, program guide 102 includes a display title area 200 that includes a display mode icon 202 and a display mode description text field 204. An interactive data control window 206 displays the date for the listings in display matrix 108.

Directly below the display area 108 are four small action controls 208-211 which give the viewer the ability to recursively vary the configuration of the display area 108. The operation and functions of these action controls is described in detail below. A world icon 214 may appear below the display area on the left side and a star (linked services available) icon 216 may appear directly below the display area on the right side.

A video window 220 may display a currently-tuned television show. Below the video window 220 is a channel window 222, a title window 224, and a current time display window 226. Each of these windows are interactive.

Overview of an EPG System

A detailed description of The EPG system, may be found in U.S. patent application Ser. No. 08/906,073 and so is herein incorporated by reference for all purposes.

Figure 2:
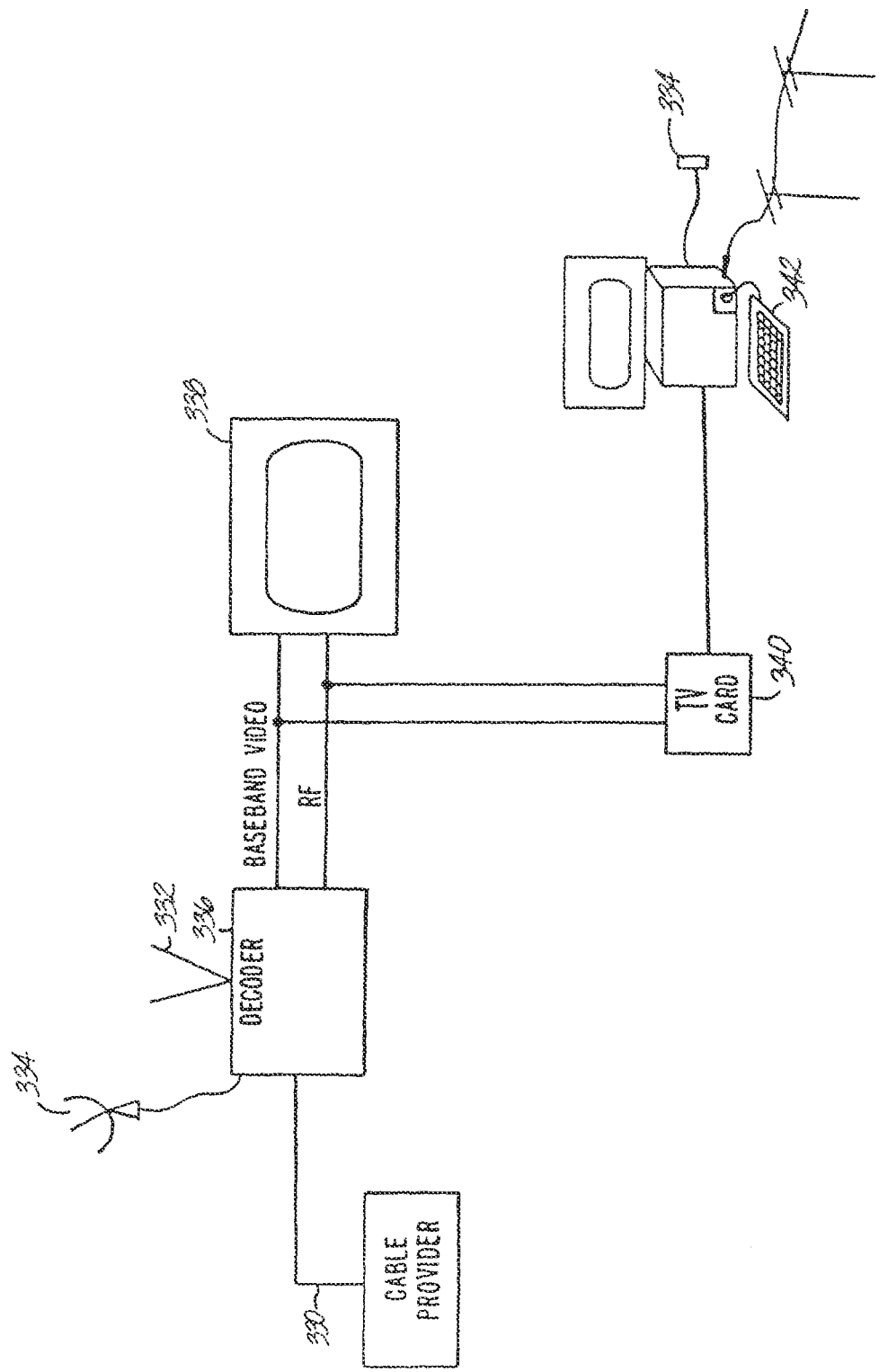
FIG. 2 is a block diagram of a TV system.

In a preferred embodiment, the electronic program guide of the invention may be implemented either on a personal computer, a PCTV, a television connected to a set-top box, or a television including a custom board. However, the invention is not limited to any particular hardware configuration and will have increased utility as new combinations of computers and television systems are developed. In the following any of the above will sometimes be referred to as a "TV system". Block diagrams of representative TV systems are depicted in FIG. 2. Details of implementation are not depicted because the invention is not limited to any particular TV system.

As is well known, the picture to be displayed may be transmitted as an analog signal, for example according to the NTSC standard utilized in the United. States, or as a digital signal modulated onto an analog carrier. The signals may be received over a cable, or via an antenna or satellite dish. Typically, television sets are designed to receive analog signals and computers display devices are designed to display pictures encoded in a digital format. However, decoder system converts the digital data to an analog signal for display on a television set and TV modems can format analog TV signals for display on a monitor.

In FIG. 2, analog or digital TV signals, received via cable 330, antenna 332, or satellite dish 334, are provided to a television system. If the signal is from a digital broadcast service, then a decoder 336 converts the signal to baseband video and audio or channel ¾ RF. If the signal is an analog signal it is passed through as a video output. The television system 338, depending on its configuration, receives selected ones of the outputs and displays the received program.

A PCTV includes a TV card 340, connected to either live video, baseband video, or channel ¾ output, digitizes the video image and displays the video image in a resizable window on the computer monitor. The PCTV is also coupled to land telephone lines by a modem 342.

If the received signal is an analog TV signal the TV card of the PCTV digitizes the analog signal and extracts included information from the vertical blanking intervals (VBI). On the other hand, if the signal is a digital signal separate audio, video, VBI (vertical blanking information such as closed caption, teletext, current time data and program related information), program guide, and conditional access information are provided as separate bit streams. The video and audio bitstreams for programs are converted to a format for display and the program guide information is processed to form program guide database. The processor, executing software stored in memory, generates interactive electronic program guide images and images of received programs. The guide can be used to interact with and control programs displayed in the window.

A television system configured to display an electronic program guide such as a guide provided by StarSight telecast includes an on-screen display controller and other hardware described below. If a standard analog broadcast signal is received program guide data, including current time data, is extracted from the VBI by a VBI data slicer and processed, to form a program database. If a DBS digital signal is received, either from a satellite or cable, VBI and program data, including current time data, are provided in separate bit streams. The program guide images are generated are either generated locally or remotely and provided to an on screen display controller. Interactivity is provided via a remote control.

Alternatively, the program guide can be displayed on a computer monitor that interactively controls the television set through, for example, an IR interface including an IR blaster 344 to generate IR codes to control, a television, a VCR and/or any other connected electronic device configured to accept and perform the commands of the on-screen menuing system.

If the electronic guide database is generated locally the system for creating the electronic programming guide must receive television schedule information and process the received information to create a database. Thus, the system requires, a data reception unit, a processor, memory to store program code and a database, an onscreen display generator (OSD), and a control interface for tuning to selected channels.

In one preferred embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 3:
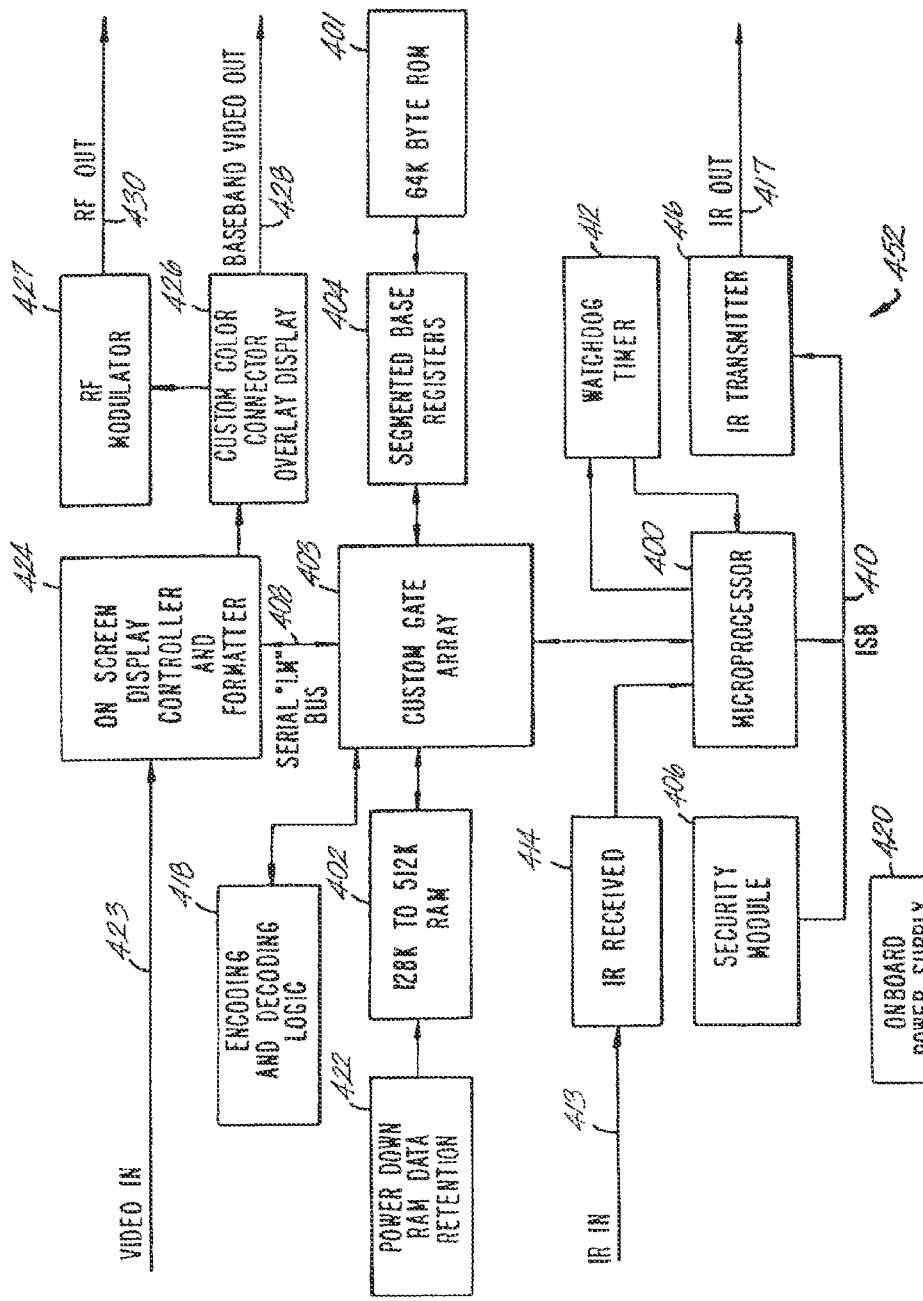
FIG. 3 is a block diagram of a hardware unit for generating an on-screen electronic programming guide (EPG).

In a preferred embodiment, a board is included at a viewer's television set and the database is stored locally and commands are transmitted in the vertical blanking intervals (VBI) of programming on a designated channel, for example PBS. An example of a board for receiving program guide information, generating program guide database, displaying the program guide, and interactively controlling the program guide is depicted in FIG. 3. The commands are transmitted to the board in the vertical blanking intervals of programming broadcast on a designated channel.

Alternatively, the commands could be transmitted to the local unit over land telephone lines. Additionally, as described below, in some systems the database is built remotely and the guide itself is transmitted to the local unit.

Figure 4:
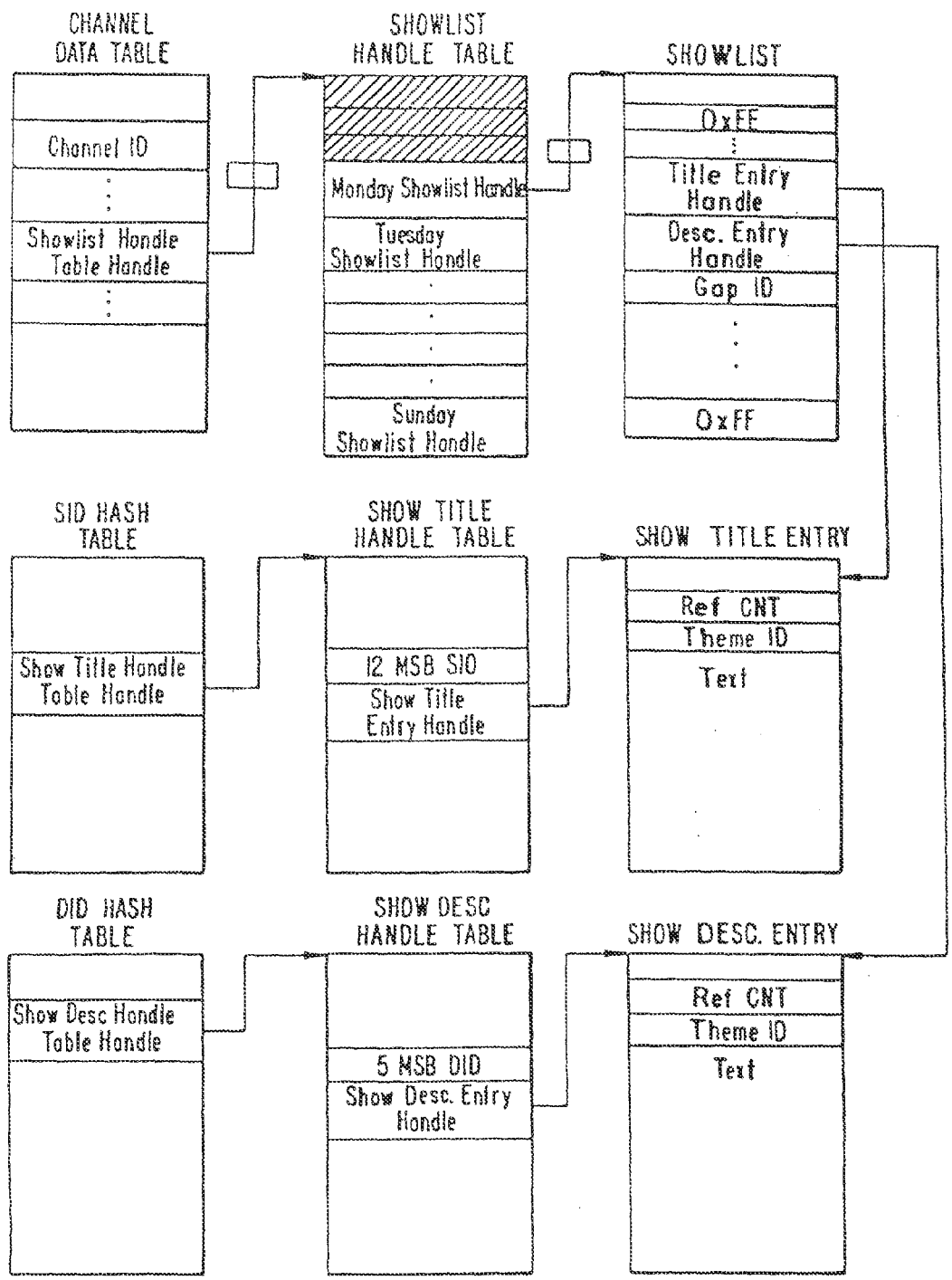
FIG. 4 is a schematic diagram of the hierarchical database utilized to generate the EPG.

The database engine builds a hierarchical database in the RAM. The hierarchical structure of the database is depicted in FIG. 4. The database is structured internally as schedule data structures and theme data structures linked, by handles and handle tables. Each handle is an index to a handle table which contains pointers to blocks of memory where items of the database are stored.

In another embodiment, for example a DSS system, program guide data is transmitted as a bit stream that is processed by the database engine.

Additionally, a N.E.W.S. (news, entertainment, weather, and sports) database has been developed. Commands including story text and story IDs are transmitted. Links from the program guide to stories related, to a program can be created and the related stories can be accessed from the guide.

An advertisement database is also created from commands including advertising text and logos including IDs for linking the ads to shows displayed in the EPG. The use may access the advertising information directly from the guide.

An internet database is also created from commands including URL to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode the display is a grid of character codes which are transferred to the on-screen display (OSD) controller which generates the on-screen display.

An input-response user interface program module responds to user input to generate new displays responsive to the particular input. In one preferred embodiment, the user utilizes an input device, e.g., a remote control, mouse, or keyboard, to place a pointer over a part of the current display and clicks. The input-response module responds to the position of the pointer and the particular display currently displayed to generate a responsive display or take a particular action. In another preferred embodiment the user interface responds to function buttons on a remote control. Specific examples will be described below.

Board Description

FIG. 3 is a block diagram embodiment of the electronic hardware unit 452 utilized to perform the electronic on-screen schedule display and other functions. The particular hardware unit 452 depicted is for TVRO (TV Receive Only) customers having home satellite dishes for television viewing. This unit is coupled in series with existing customer TVRO equipment.

In FIG. 3, the unit receives Baseband Video in 423 from the customer TVRO system. The unit optionally outputs Baseband Video out 428 or channel ¾ RF out 430. The unit includes an 8-bit microprocessor 400, 64 bytes of code ROM 401, 512 K of RAM 402 for program data storage, a custom gate array 403, segmented base registers 404 for fast memory data manipulation, security logic 406 for decoding incoming encrypted data, a serial bus 408 for display controller interface, serial bus 410 for inter-processor communication, watchdog timer 112 for error recovery, IR input 413, IR transmitter circuits 416 for TV, VCR control, IR output 417, CRC-32 encoding and decoding logic 418, on-board power supply, 420, video input 423, On-Screen Display Controller and Formatter 424, custom color converter 426, RF modulator 427, choice of Baseband Video or RF outputs 428 or 430.

The on-screen display controller and formatter (OSDCF) 424 functions as an I/O controller, an on-screen display controller (OSD), and also as a closed-caption data (CCD) VBI data slicer. The VBI (vertical blanking interval) is a dead space signal that allows a television signal to reposition the scanning electron beam from the bottom to the top of the screen. Digital data, for example close-captioned data, or current time data, is modulated onto the carrier signal during the VBI.

The OSDCF 424 includes an analog to digital converter (ADC) which digitizes the incoming baseband video and extracts digital information transmitted in the VBIs. As explained more fully below, messages for transmission to the database are transmitted in the VBIs. These messages are transferred to the processor 400 which executes a data base engine process to build or update the database.

The OSD part of the OSDCF 424 includes cache memory, character memory, timing functions, and an external RAM. The OSD reads high level graphic commands sent from the processor 400 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD which the generates a local, video signal that causes the display screen to be displayed on the television screen.

Scheduling Data Structures

The database engine (DBE) builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where structures of the database are stored.

The hierarchy for the schedule data structures, in descending order, is:
Channel Data Table: contains subscriber unit's list of channels;
Show List: contains time slots, for each Show scheduled to be broadcast for a channel;
Show Title: contains the title text and Show title attributes;
Show Description: contains show's ratings, attributes, and description text.

A channel data table, depicted in FIG. 5A, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

Figure 5B:
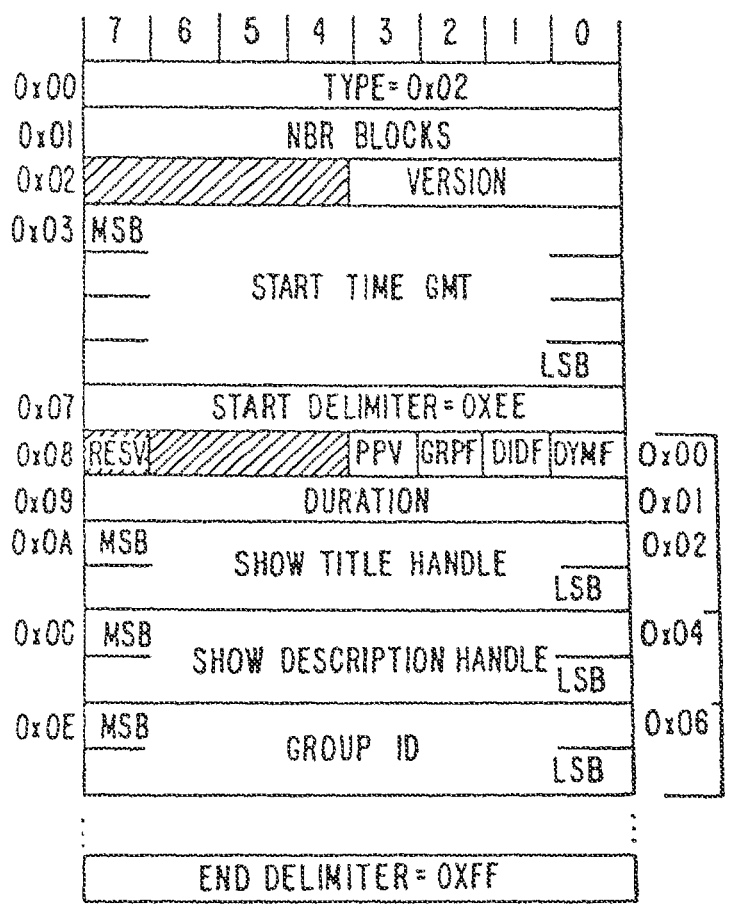

The next data structure in the hierarchy is the show list depicted in FIG. 5B, The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of show list and adding duration values.

The database, when fully constructed, holds a week's worth of show lists for each channel. The days of the week are accessed by incrementing the show list handle by two bytes. The show lists are updated each day at midnight GMT with the show list for the day just completed being deleted and the show list for same day next week being added to the database.

Figure 5C:
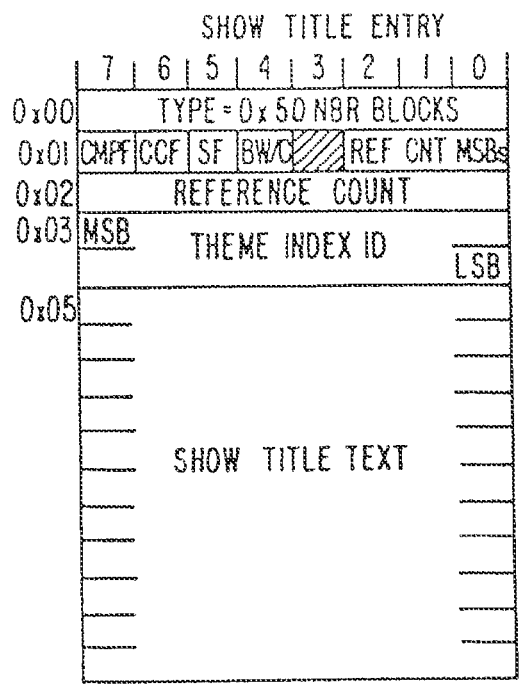
Figure 5D:
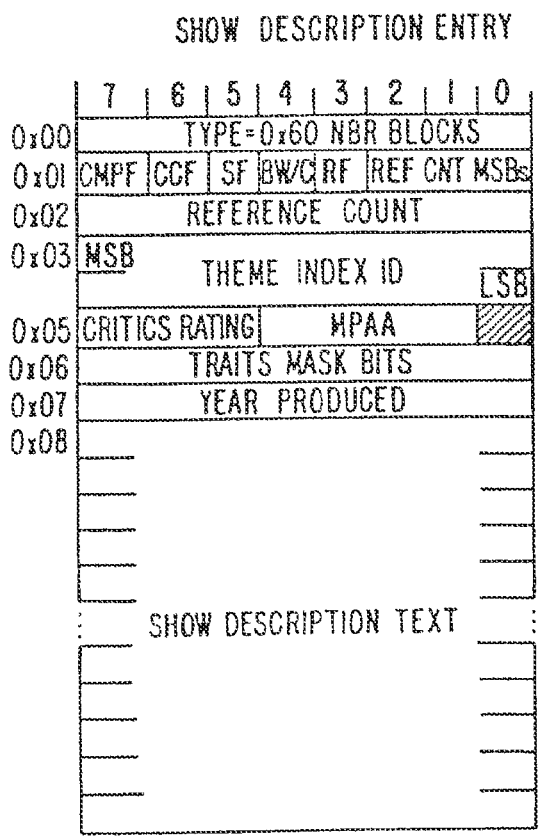

The next data structures in the schedule hierarchy are the show title entries, depicted in FIG. 5C and show description entries, depicted in FIG. 5D. For a given show slot, the show title entry and show description entry are accessed utilizing the handles included in the slot. The show title and show description entries are stored in a memory pool divided into blocks. Each show title is identified by a unique 20-bit show identification number (SID) and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes theme index. ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry includes a theme index ID, critics rating, MPAA rating for the show, traits mask bits, year produced, and show description text. Show description entries tend to have a shorter life than show title entries because a description is only valid for a particular episode of a series.

User Interface

The user interface takes remote control commands as its primary input. In one embodiment a user requests various functions by pressing function buttons on a remote control. In another embodiment, the GUI is utilized with different interactive regions on a displayed screen corresponding to different functions. The user moves the cursor over the interactive region corresponding to a desired function and selects the function to generate command. The particular form of entering a command is not critical and technology for utilizing voice commands may soon be available.

The user interface receives commands and responds with a requested display screen and by performing the function requested by the command. The function performed may be to perform an action such as selecting a new viewer guide based on the Time. Indicator glyphs, accessing a related internet site, controlling the features of an integrated electronic device, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect, all necessary data and format the screen. The exit function is called to release memory and data for the screen. The update function is called once per minute to update the screen time and to redraw the screen if any information displayed on the screen needs to be updated.

Once in a particular state, the table contains a reference to another software function. corresponding to each key on the remote control or to each interactive, region on the screen. These referenced functions will be executed whenever an associated remote control button is pressed or interactive region is selected.

For example, if the user wishes to choose a new viewer guide, in the GUI embodiment, the viewer moves the cursor over the Time Bar interactive region which is then selected to request a new time indicator. A confirmation screen will then be generated.

The screens are displayed by the on-screen display (OSD) controller based on graphic display commands issued by the database engine. Among the primitive commands, needed to draw system display screens are the Erase Screen Command; Draw Rectangle Command; Save Rectangle Command; Restore Rectangle Command; Move Rectangle Commands; Write ASCII String Command; and Draw Channel Icon Command.

Each screen includes areas that are constant and based on code and data stored in non-volatile memory and variable areas such as show titles and descriptions which utilize data stored in the database. Additionally, graphics files are also being stored in the database to be displayed in windows of the display screen.

Description of the On-Screen Menuing System

Figure 6:
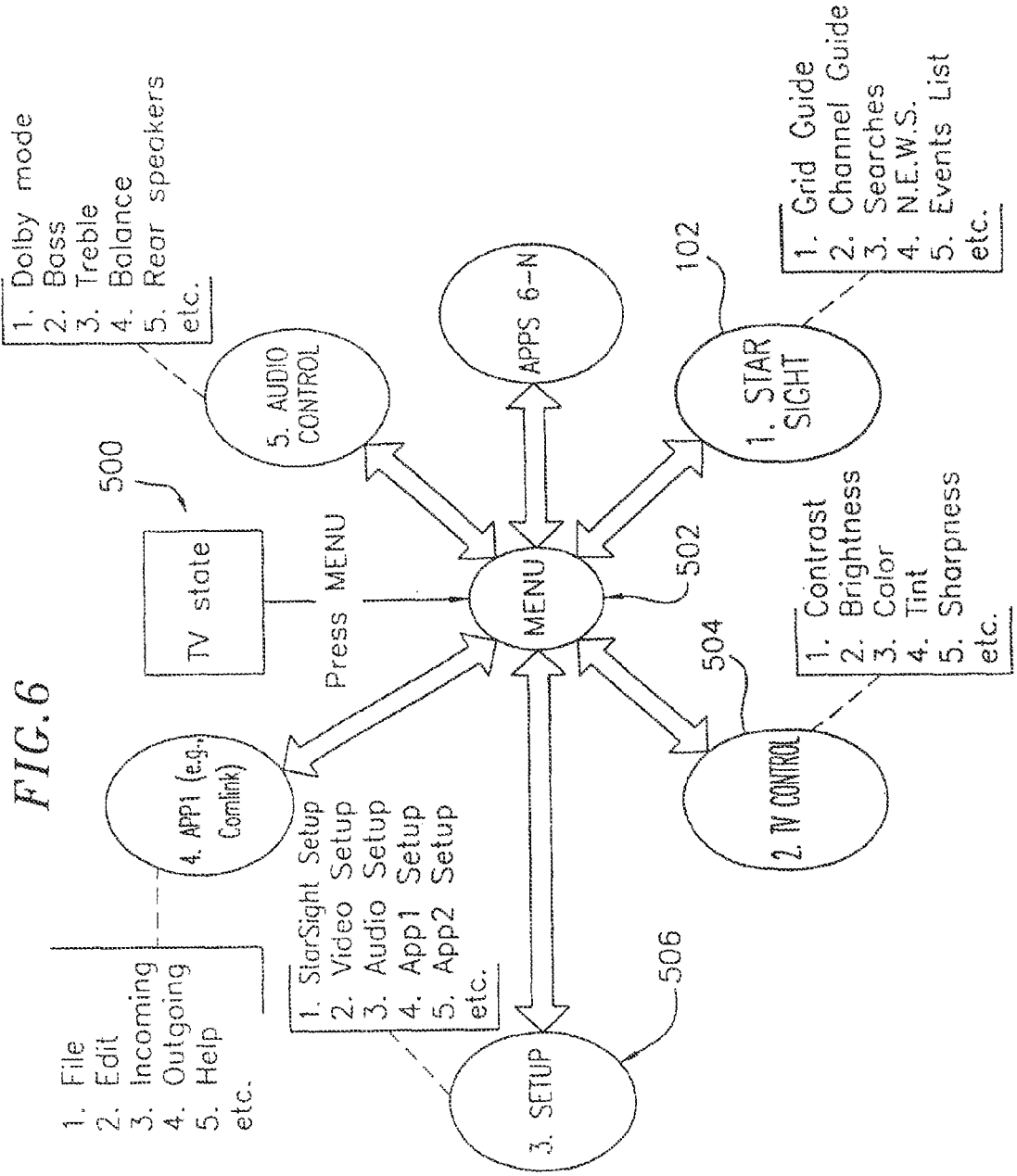
FIG. 6 is a flow diagram of a menuing hierarchy.

Referring to FIGS. 6-7, the main menu and sub menu hierarchy is depicted. Using the interactive capabilities of the on-screen menuing system, the user is able to access a variety of linked menus. FIG. 6 depicts a plurality of linked menus in which a viewer may navigate using the pointer/cursor and the interactive nature of the on-screen menuing system. FIG. 6 depicts the ability of the user to move from a TV state 500 to a main menu state 502. The user may also reach any of the sub menus, including the program guide 102, TV controls guide 504, setup guide 506 and any other menu that may be added to the on-screen menuing system.

These menus control the various features of the connected electronic devices. The graphical nature of the menus is such that the control structure and format is similar from menu to menu. This feature allows the user to be familiar with the control structure when operating any of the various integrated electronic devices, e.g., the look and feel of the menu that selects the channels to be viewed with the television tuner is similar to the menu displayed to control the channel to be viewed, when using the integrated vcr tuner. The familiar nature of the graphical interface allows for a shorter learning curve of the features of the integrated electronic devices when the user initially encounters the onscreen menuing system.

The menuing system is especially useful in a host TV system utilizing programmed control of host functions, for example, basic native host functions such as brightness, color, volume and other controls. The present menuing system provides an integrated visual systems for controlling both native host features as well as program guide features. Further, the menuing system provides a common interface, for other programs which can be resident on the host processor.

Accordingly, the present system provides a common interface and is thus portable from system to system.

Figure 7A:
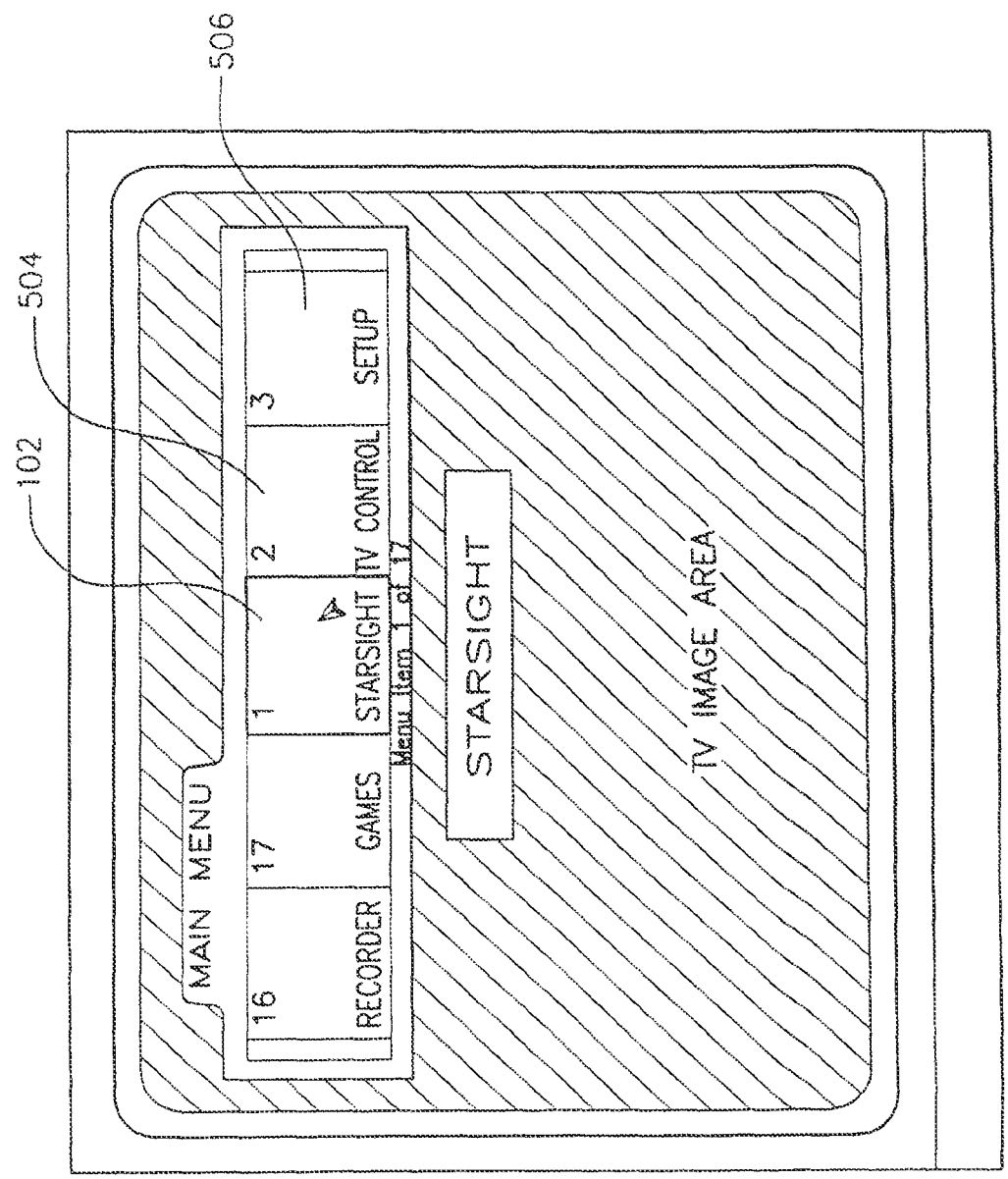
FIG. 7A is a screen depiction of a series of sub-menus.

Referring now to FIG. 7A, an embodiment of the structure of the menuing system is depicted schematically. FIG. 7A depicts the top level functions. The user can advance to any top-level application by moving the pointer to the option on the menu and selecting the option. The STARSIGHT option is bolded in this embodiment which indicates the pointer will automatically be positioned over this option when the menu first appears.

Each menu option may lead to any number of further sub-menus, so that a particular option may be buried as many levels deep as appropriate. For example, a user who selects the TV control 504 application can see a series of menus as shown in FIG. 7B.

Figure 7C:
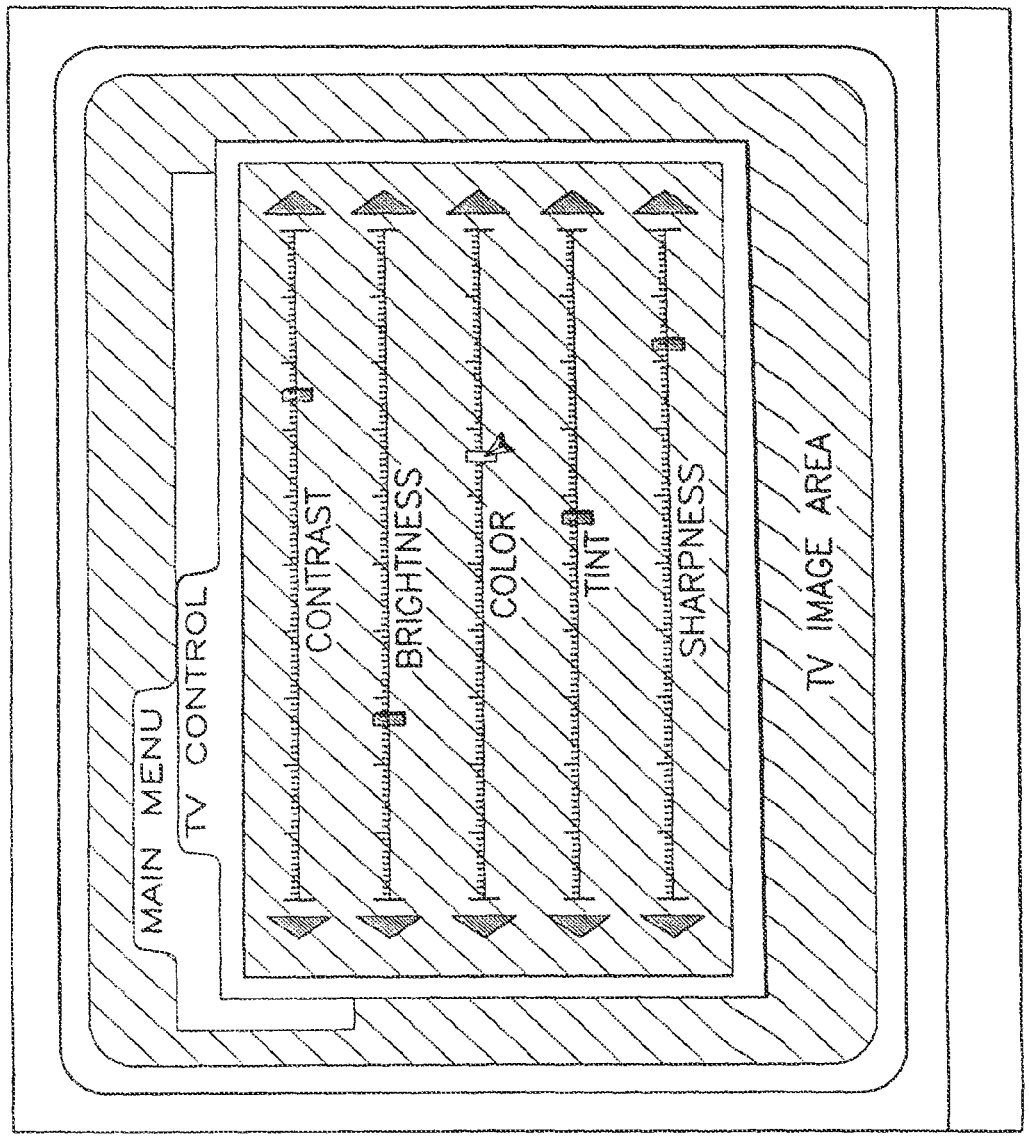

FIGS. 7B-7C depict several host functions. The TV control menu 504 is shown. A user can interactively control the various picture controls by maneuvering the pointer/cursor and selecting a specific control to adjust. For example, FIG. 7B depicts the contrast, brightness, color, tint, and sharpness controls of a television. Any number of television controls may be added to the on-screen menuing system.

Further, as described above, since the present menuing system provides a consistent interface to all programs, selecting an application works the same way for EPG applications, host applications, and third party applications. An example of such an application is depicted in FIG. 7D where a communication program is controlled by the on-screen menuing system interface.

Figure 7E:
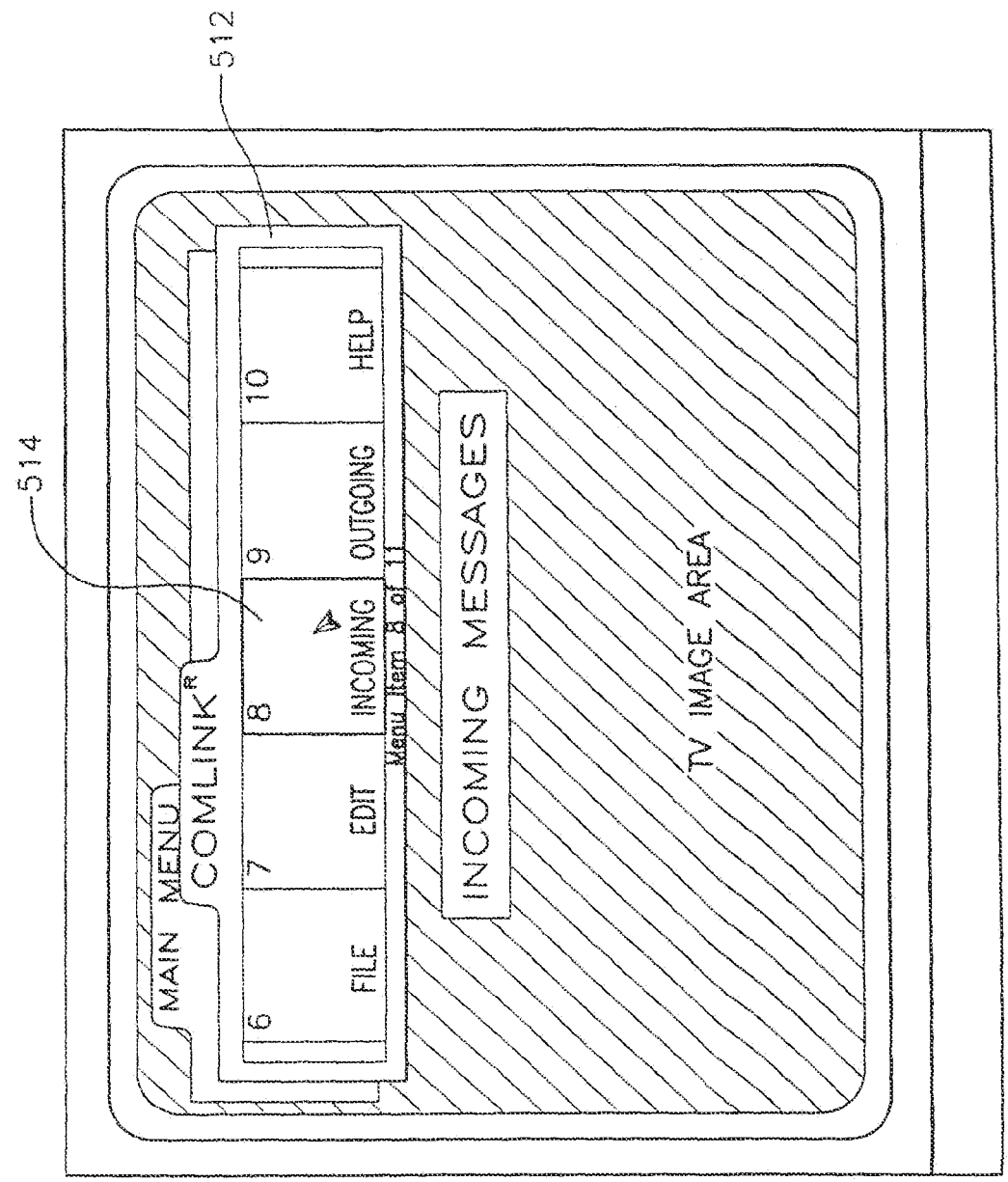

FIG. 7E depicts several sub level command functions of the comlink menu 512. This Figure illustrates how the display of the on-screen menuing system is similar for all of the integrated, electronic devices.

Figure 7F:
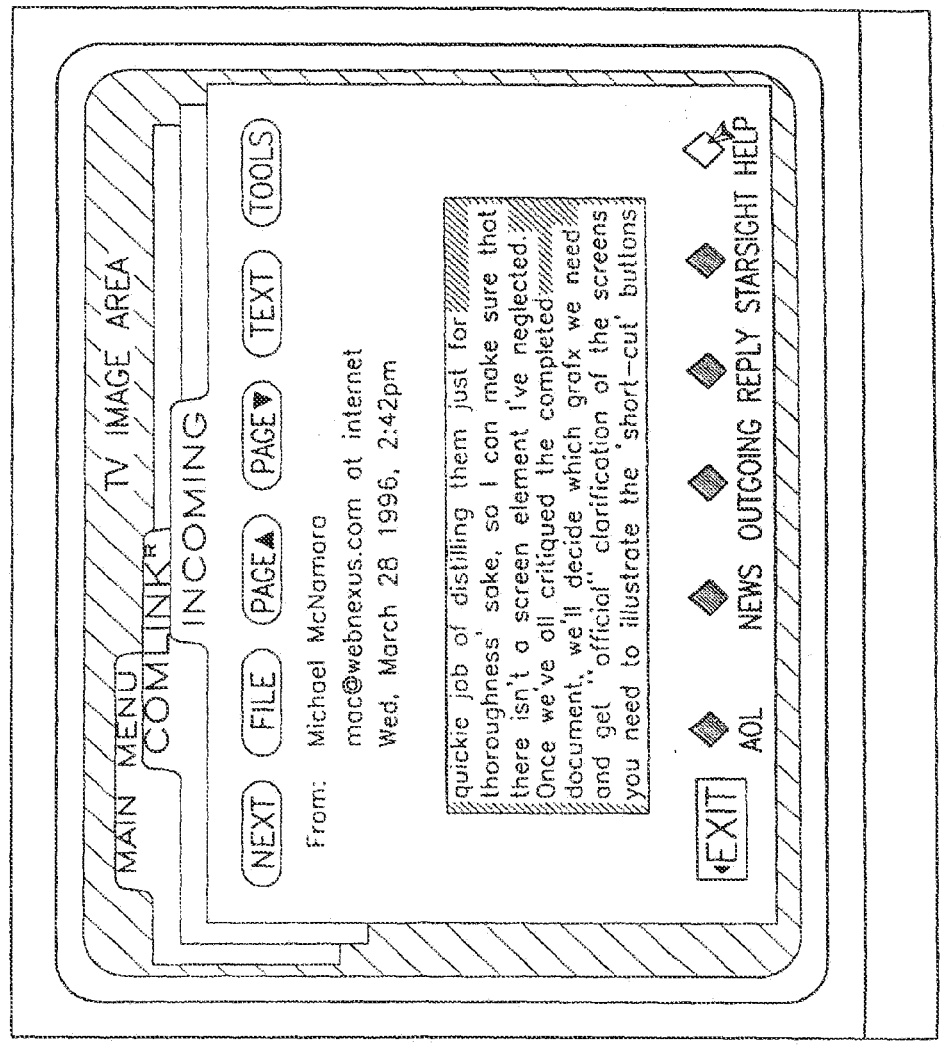
FIG. 7F is a screen depiction of a series of host function commands.

FIG. 7F depicts a host command function for the comlink sub-menu. Here, the incoming command 514 is executed by the user by positioning the pointer/cursor above a selected interactive glyph.

Description of the Current Time Display

Figure 8:
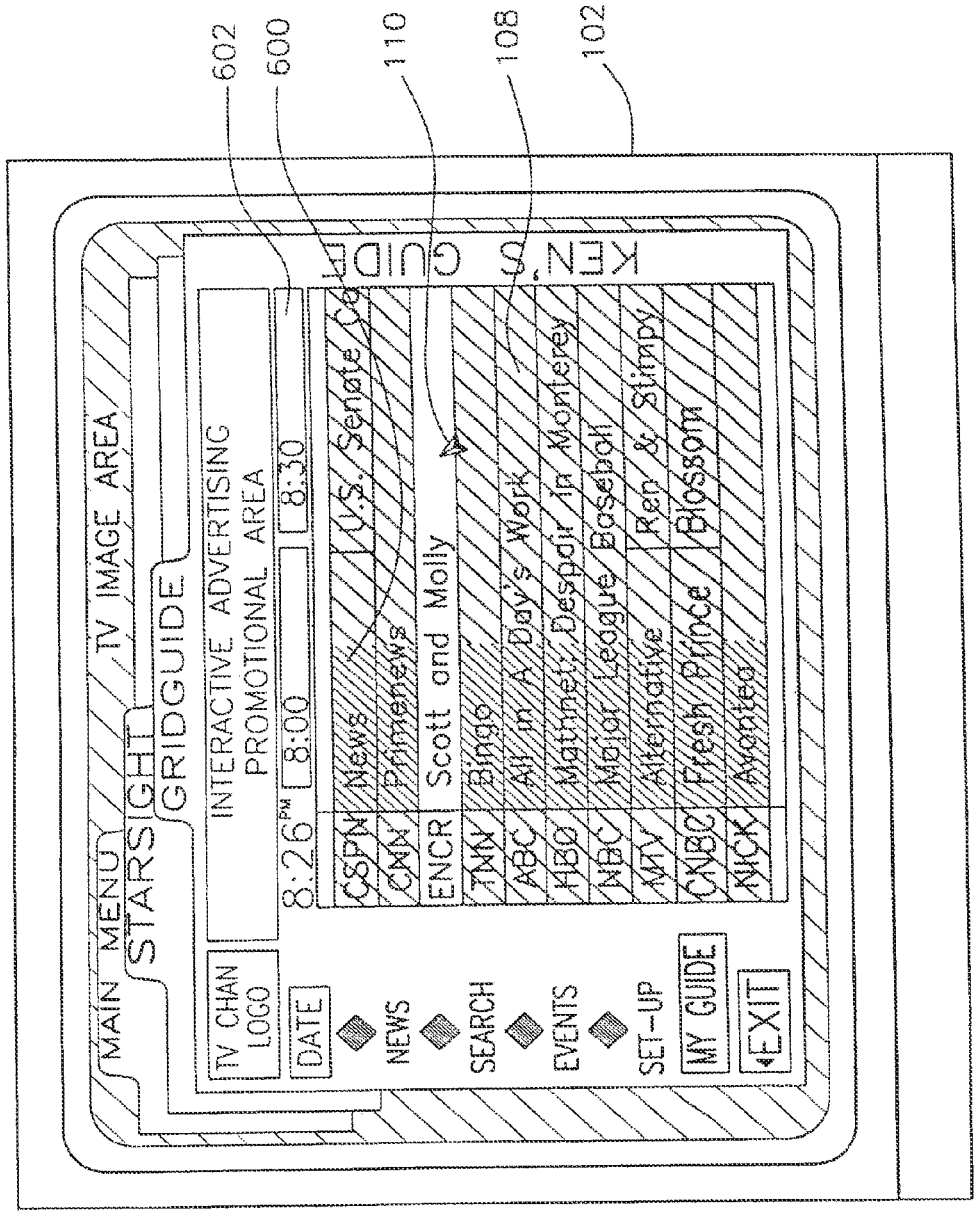
FIG. 8 is a screen depiction of the current time data depicted as a darkened area on the EPG screen.

Referring to FIG. 8, the current time and the passage of time is displayed for the viewer using the program guide 102. A current time and time remaining bar 600 is depicted on the program matrix 108. In a preferred embodiment, the current time and time remaining bar 500 will be indicated to the viewer on the left side of the program matrix 108, for example, by changing the background color of the current time and time remaining bar area from one color to a slightly darker color. This darkening of the current time and time remaining bar area is depicted as a vertical bar that sweeps across the display area from left to right. The current time and time remaining bar also grows in width as time progresses in a manner that depicts both the current time, the passage of time and the time remaining for any particular program currently displayed on the program matrix 108. The viewer is thereby able to easily determine the time remaining and when the next program on a specific channel will begin.

The current time is maintained in the data structure. The processor reads the current time data and the EPG display controller displays the current time and time remaining bar information on the program guide 102. Periodically the current time is reread by the processor and the newer grid, guide is redisplayed.

Description of Time Bar Glyph

Figure 9:
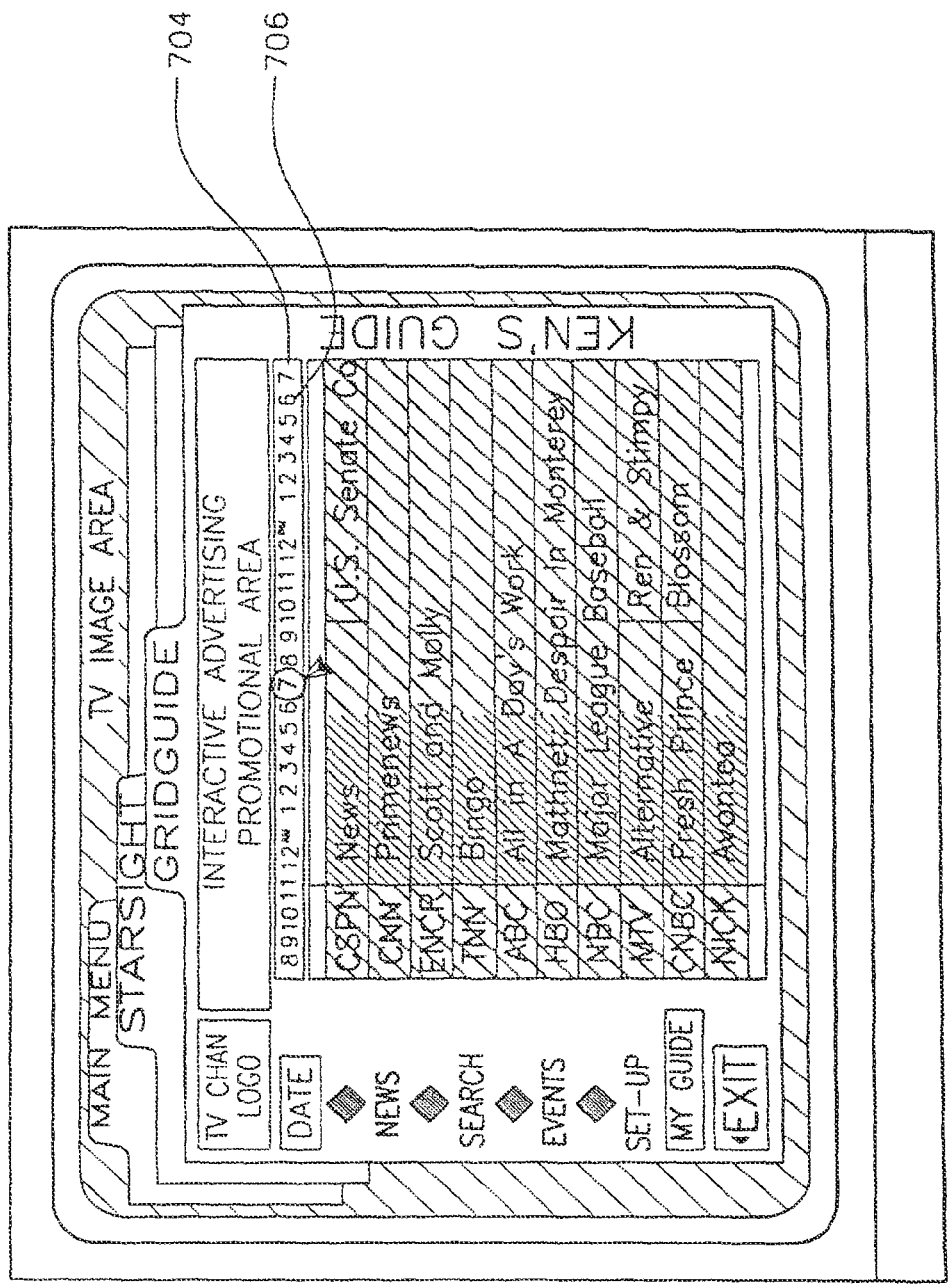
FIG. 9 is a screen depiction of the Time Bar glyph which includes a series of Time Indicator glyphs.

The time bar 704 allows the user to interactively choose a desired time frame to be viewed. As can be seen in FIG. 1, in a first configuration, the time glyph 602 is an interactive area of the program guide 102. In this state, the time glyph depicts the current time frame displayed on the program guide 102. However, as can be seen in FIG. 9, when a user moves the pointer/cursor 110 over the time glyph 602, the glyph immediately becomes the time bar glyph 704. The time bar glyph depicts a longer span of time. In a preferred embodiment, this longer span of time is 12 hours. The longer span of time indicates an interactive area in which the user may choose a specific time frame to be displayed on the viewer grid guide. The time bar glyph 704 includes a series of time indicator glyphs 706. If any of these glyphs are chosen by the user by positioning the pointer and then activating the chosen glyph, the EPG grid guide will display the viewer guide associated with the chosen time indicator glyph.

This interactive nature of the time bar 704 allows the user to quickly and easily display any desired future time span of the program guide 102.

Description of the Morphing Pointer/Cursor

As can be seen in FIG. 1, the pointer/cursor 110 normally appears as an arrow or triangle. The tip of the pointer/cursor 110 indicates the interactive area of the EPG to be chosen.

Figure 10A:
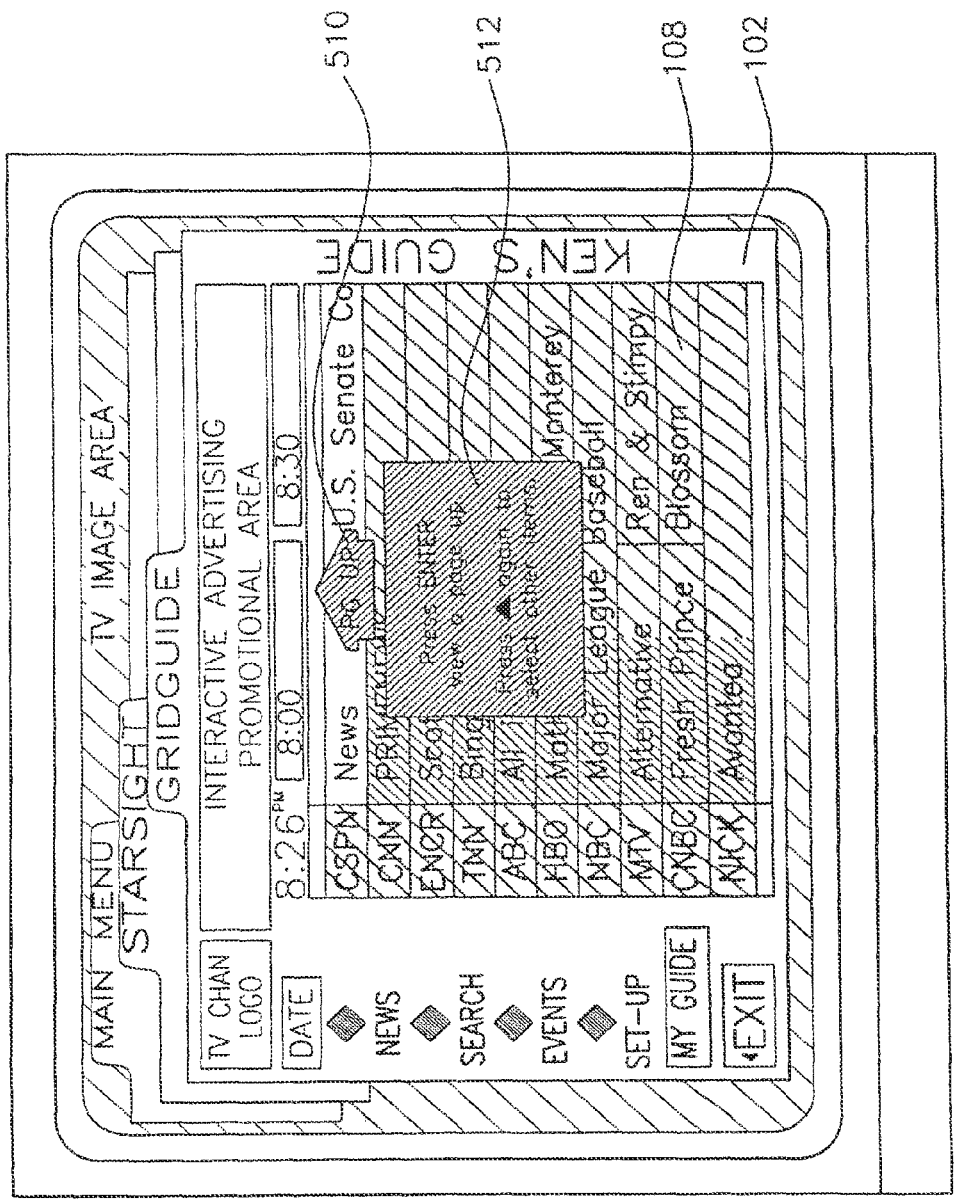
FIG. 10A-10C are screen depictions of the pointer/cursor which depicts alternate or additional information.
Figure 10B:
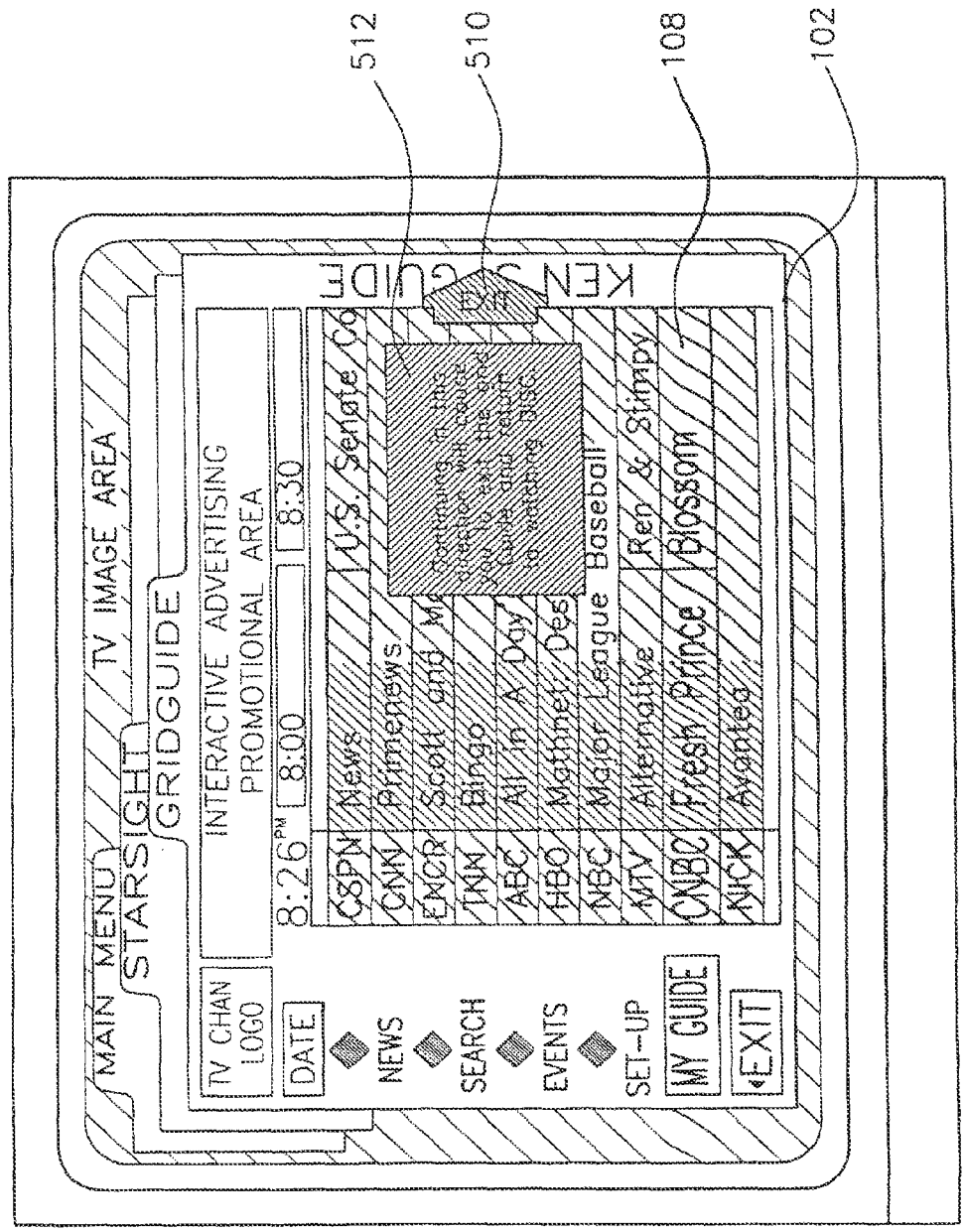

However, referring to FIG. 10A or 10B, when a user moves the pointer/cursor 110 to the edge of the program matrix 108, the configuration of the pointer/cursor 110 changes to indicate to the user alternate or additional information. FIG. 10A shows that the cursor has changed into an icon that represents that the program matrix 108 may be shifted by an entire page. Alternatively, the pointer/cursor in this changed configuration may perform some other command when activated. In addition, depending on the location of the pointer/cursor, the shape of the pointer/cursor may change and an additional informational window may appear. These additional informational windows 512 are designed to fade from view when the information provided is no longer necessary for the user or following a predetermined period of time, or a predetermined set of commands has been issued buy the user.

Figure 10C:
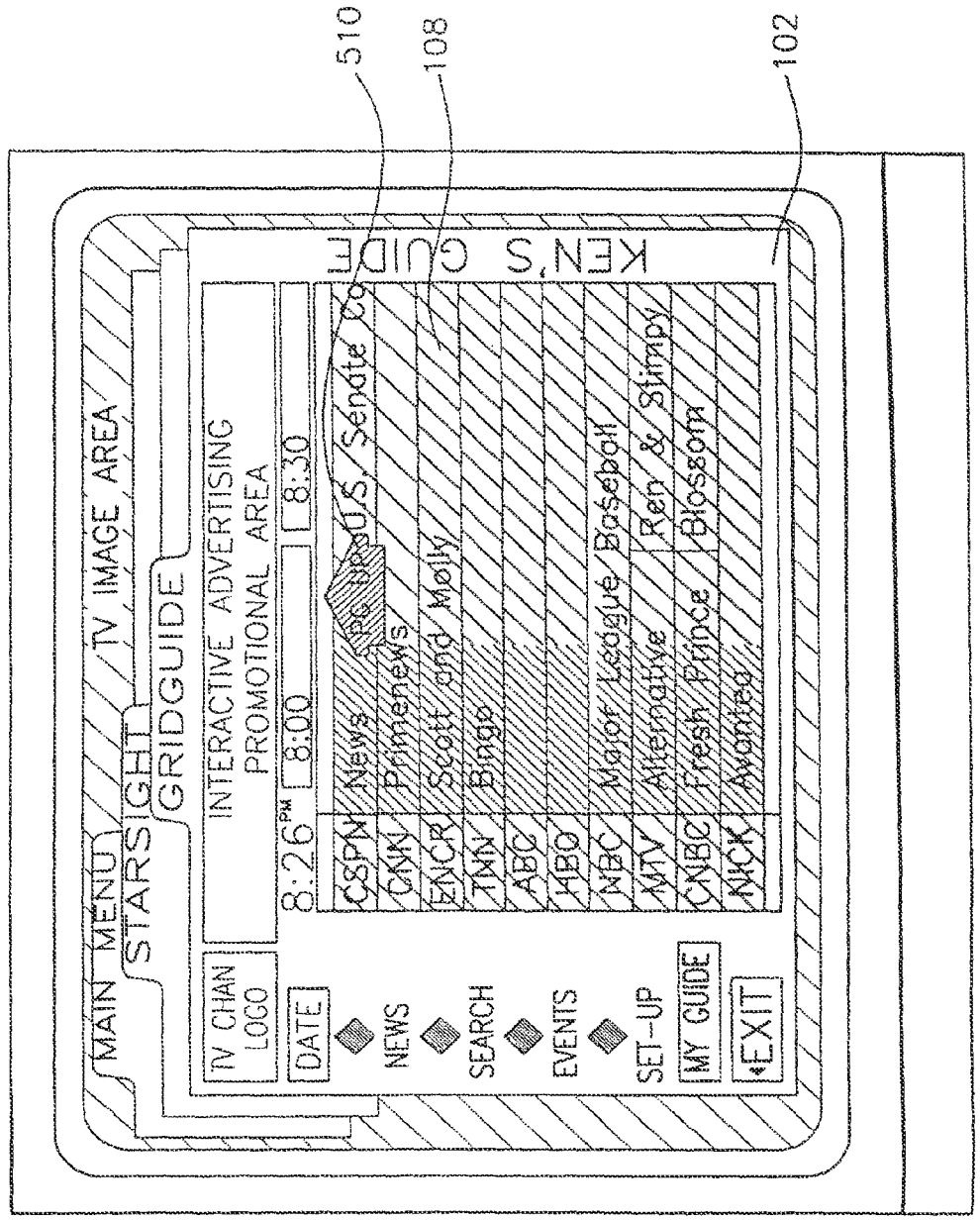

FIG. 10C depicts a program guide 102, and an additional configuration for a pointer/cursor without the additional informational window 512.

What is claimed is:

1. A method for navigating media asset information, the method comprising:
    receiving media asset identifier information via a communications interface;
    storing the media asset identifier information in a database stored in a memory;
    generating for display an interactive time bar comprising a first interactive time indicator icon and a second interactive time indicator icon of a series of interactive time indicator icons, wherein the first interactive time indicator icon is associated with a first time interval, and wherein the second interactive time indicator icon is associated with a second time interval that does not overlap the first time interval;
    receiving, from a user input interface, a first user input comprising a selection of the first interactive time indicator icon associated with the first time interval;
    based on receiving the first user input:
        retrieving data representing the first time interval associated with the first interactive time indicator icon;
        identifying, based on the retrieved data representing the first time interval, a first plurality of media asset identifiers associated with the first time interval from the media asset identifier information stored in the database stored in the memory;
        retrieving the identified first plurality of media asset identifiers from the database stored in the memory;
        generating for display the retrieved first plurality of media asset identifiers associated with the first time interval;
    receiving, from the user input interface, a second user input comprising a selection of the second interactive time indicator icon associated with the second time interval;
    based on receiving the second user input:
        retrieving data representing the second time interval associated with the second interactive time indicator icon;
        identifying, based on the retrieved data representing the second time interval, a second plurality of media asset identifiers associated with the second time interval from the media asset identifier information stored in the database stored in the memory;
        retrieving the identified second plurality of media asset identifiers from the database stored in the memory; and
        generating for display the retrieved second plurality of media asset identifiers associated with the second time interval.

2. The method of claim 1, wherein the retrieving the first plurality of media asset identifiers associated with the first time interval, further comprises:
    issuing a query to the database for media asset entries associated with the first time interval.

3. The method of claim 1 further comprising:
    identifying a common horizontal axis within the interactive time bar; and
    generating for display the series of interactive time indicators along the identified common horizontal axis within the interactive time bar.

4. The method of claim 1, further comprising receiving the media asset identifier information from the communications interface comprising at least one of a telephone interface, a satellite interface, and a cable interface.

5. The method of claim 1, wherein receiving the media asset identifier information further comprises:
    decrypting information received via the communications interface.

6. The method of claim 1, further comprising:
    receiving the media asset identifier information as a series of schedule information packets.

7. The method of claim 1, further comprising:
    retrieving, based on receiving the first user input, the first plurality of media asset identifiers associated with the first time interval associated with a current time from the media asset identifier information stored in the database stored in the memory.

8. A system for navigating media asset information, the system comprising:

a memory configured to store a database of media asset identifier information;

a user input interface configured to receive inputs comprising selections of interactive time indicator icons; and control circuitry configured to:
- receive media asset identifier information via a communications interface;
- store the media asset identifier information in the database stored in the memory;
- generate for display an interactive time bar comprising a first interactive time indicator icon and a second interactive time indicator icon of a series of interactive time indicator icons, wherein the first interactive time indicator icon is associated with a first time interval, and wherein the second interactive time indicator icon is associated with a second time interval that does not overlap the first time interval;
- receive, from the user input interface, a first user input comprising a selection of the first interactive time indicator icon associated with the first time interval;
- based on receiving the first user input:
  - retrieve data representing the first time interval associated with the first interactive time indicator icon;
  - identify, based on the retrieved data representing the first time interval, a first plurality of media asset identifiers associated with the first time interval from the media asset identifier information stored in the database stored in the memory;
  - retrieve the identified first plurality of media asset identifiers from the database stored in the memory;
  - generate for display the retrieved first plurality of media asset identifiers associated with the first time interval;
- receive, from the user input interface, a second user input comprising a selection of the second interactive time indicator icon associated with the second time interval;
- based on receiving the second user input:
  - retrieving data representing the second time interval associated with the second interactive time indicator icon;
  - identifying, based on the retrieved data representing the second time interval, a second plurality of media asset identifiers associated with the second time interval from the media asset identifier information stored in the database stored in the memory;
  - retrieve the identified second plurality of media asset identifiers from the database stored in the memory; and
  - generate for display the retrieved second plurality of media asset identifiers associated with the second time interval.

9. The system of claim 8, wherein the control circuitry is further configured to:
retrieve the first plurality of media asset identifiers associated with the first time interval by issuing a query to the database for media asset entries associated with the first time interval.

10. The system of claim 8 wherein the control circuitry is further configured to:
identify a common horizontal axis within the interactive time bar; and
generate for display the series of interactive time indicators along the identified common horizontal axis within the interactive time bar.

11. The system of claim 8, wherein the control circuitry is further configured to:
receive the media asset identifier information from the communications interface, comprising at least one of a telephone interface, a satellite interface, and a cable interface.

12. The system of claim 8, wherein the control circuitry is further configured to:
receive the media asset identifier information by decrypting information received via the communications interface.

13. The system of claim 8, wherein the control circuitry is further configured to:
receive the media asset identifier information as a series of schedule information packets.

14. The system of claim 8, wherein the control circuitry is further configured to:
retrieve, based on receiving the first user input, the first plurality of media asset identifiers associated with the first time interval associated with a current time from the media asset identifier information stored in the database stored in the memory.

15. A non-transitory computer readable medium comprising instructions recorded thereon comprising:
an instruction for receiving media asset identifier information via a communications interface;
an instruction for storing the media asset identifier information in a database stored in a memory;
an instruction for generating for display an interactive time bar comprising a first interactive time indicator icon and a second interactive time indicator icon of a series of interactive time indicator icons, wherein the first interactive time indicator icon is associated with a first time interval, and wherein the second interactive time indicator icon is associated with a second time interval that does not overlap the first time interval;
an instruction for receiving a first user input from a user input interface, comprising a selection of the first interactive time indicator icon associated with the first time interval;
an instruction for retrieving, based on receiving the first user input, data representing the first time interval associated with the first interactive time indicator icon;
an instruction for identifying, based on receiving the first user input and based on the retrieved data representing the second time interval, a first plurality of media asset identifiers associated with the first time interval from the media asset identifier information stored in the database stored in the memory;
an instruction for retrieving, based on receiving the first user input, the identified first plurality of media asset identifiers from the database stored in the memory;
an instruction for generating for display, based on receiving the first user input, the retrieved first plurality of media asset identifiers associated with the first time interval;
an instruction for receiving from the user input interface, a second user input comprising a selection of the second interactive time indicator icon associated with the second time interval;
an instruction for retrieving, based on receiving the second user input, data representing the second time interval associated with the second interactive time indicator icon;

an instruction for identifying, based on the retrieved data representing the second time interval and based on receiving the second user input, a second plurality of media asset identifiers associated with the second time interval from the media asset identifier information stored in the database stored in the memory;

an instruction for retrieving, based on receiving the second user input, the identified second plurality of media asset identifiers from the memory; and an instruction for generating for display, based on receiving the second user input, the retrieved second plurality of media asset identifiers associated with the second time interval.

16. The non-transitory computer readable medium of claim 15, further comprising:

an instruction for issuing a query to the database for media asset entries associated with the first time interval.

17. The non-transitory computer readable medium of claim 15, further comprising:

an instruction for identifying a common horizontal axis within the interactive time bar; and an instruction for generating for display the series of interactive time indicators along the identified common horizontal axis within the interactive time bar.

18. The non-transitory computer readable medium of claim 15, further comprising:

an instruction for receiving the media asset identifier information from the communications interface, comprising at least one of a telephone interface, a satellite interface, and a cable interface.

19. The non-transitory computer readable medium of claim 15, further comprising:

an instruction for decrypting information received via the communications interface.

20. The non-transitory computer readable medium of claim 15, further comprising:

an instruction for receiving the media asset identifier information as a series of schedule information packet.

\* \* \* \* \*